(12) United States Patent
Asukai et al.

(10) Patent No.: US 7,610,260 B2
(45) Date of Patent: Oct. 27, 2009

(54) METHODS AND APPARATUS FOR SELECTING AND PROVIDING CONTENT DATA USING CONTENT DATA STATUS INFORMATION

(75) Inventors: Masamichi Asukai, Kanagawa (JP); Takatoshi Nakamura, Kanagawa (JP); Mitsuru Takehara, Tokyo (JP); Yoichiro Sako, Tokyo (JP); Toshiro Terauchi, Tokyo (JP); Makoto Inoue, Tokyo (JP); Katsuya Shirai, Kanagawa (JP)

(73) Assignee: Sony Corporation, Tokyo (JP)

( * ) Notice: Subject to any disclaimer, the term of this patent is extended or adjusted under 35 U.S.C. 154(b) by 298 days.

(21) Appl. No.: 11/486,334

(22) Filed: Jul. 13, 2006

(65) Prior Publication Data

US 2007/0022112 A1    Jan. 25, 2007

(30) Foreign Application Priority Data

Jul. 19, 2005   (JP)   ............................. 2005-208026

(51) Int. Cl.
*G06F 7/00* (2006.01)
*G06F 17/30* (2006.01)
*G06F 12/00* (2006.01)
(52) U.S. Cl. .......................................... 707/1; 707/204
(58) Field of Classification Search ........................ None
See application file for complete search history.

(56) References Cited

U.S. PATENT DOCUMENTS 4,930,077 A * 5/1990 Fan ................. 704/8
5,246,411 A * 9/1993 Rackman et al. ............... 482/57
6,904,408 B1 * 6/2005 McCarthy et al. ............... 705/2
2003/0118323 A1 * 6/2003 Ismail et al. ................... 386/83
2005/0041951 A1 * 2/2005 Inoue et al. .................... 386/46
2007/0262990 A1   11/2007 Terauchi et al.

FOREIGN PATENT DOCUMENTS

| JP | 10-055368 A | 2/1998 |
| JP | 11-066049 A | 3/1999 |
| JP | 11-291663 | 10/1999 |

(Continued)

OTHER PUBLICATIONS

Wang et al., Automatic Image Annotation and Retrieval Using Subspace Clustering Algorithm, Nov. 13, 2004, ACM, pp. 100-108.*

*Primary Examiner*—Pierre M Vital
*Assistant Examiner*—Jason Liao
(74) *Attorney, Agent, or Firm*—Wolf, Greenfield & Sacks, P.C.

(57) ABSTRACT

Methods and apparatus for selecting and providing content data such as visual data and audio data. Pieces of content data are associated with corresponding metadata. The metadata includes information regarding a status at the time of generation of the content data. For example, at the time a picture is taken. The status may include information such as a time, location, and bio-information of a user. A recollection value, representing the significance in recollecting the user's memory, is calculated for each piece of content data using the associated metadata. Content data is selected for output based on the recollection values. Various types of content data may be selected at appropriate times so that the content data will affect the user's memory or feeling.

25 Claims, 17 Drawing Sheets

| CONTENT DATA | METADATA | | | |
|---|---|---|---|---|
| | TIME | POSITION | | BIO-INFORMATION (EMOTIONAL INFORMATION) |
| | | LATITUDE | LONGITUDE | |
| DATA A | tA | xA | yA | eA |
| DATA B | tB | xB | yB | eB |
| ⋮ | ⋮ | ⋮ | ⋮ | ⋮ |

FOREIGN PATENT DOCUMENTS

| | | |
|---|---|---|
| JP | 2002-015057 A | 1/2002 |
| JP | 2002-73608 | 3/2002 |
| JP | 2002-136820 | 5/2002 |
| JP | 2003-330920 | 11/2003 |
| JP | 2006-004152 A | 1/2006 |

* cited by examiner

FIG. 2

| CONTENT DATA | TIME | METADATA |||
| --- | --- | --- | --- | --- |
| | | POSITION || BIO-INFORMATION (EMOTIONAL INFORMATION) |
| | | LATITUDE | LONGITUDE | |
| DATA A | tA | xA | yA | eA |
| DATA B | tB | xB | yB | eB |
| ⋮ | ⋮ | ⋮ | ⋮ | ⋮ |

FIG. 3

METADATA

METADATA OF DATA A : (tA, xA, yA, eA)  ... (1)
METADATA OF DATA B : (tB, xB, yB, eB)  ... (2)

DISTANCE dAB BETWEEN DATA A AND DATA B

$$dAB = \text{sqrt}(\text{sqr}(tB/T - tA/T) + \text{sqr}(xB/X - xA/X) \\ + \text{sqr}(yB/Y - yA/Y) + \text{sqr}(eB/E - eA/E)) \quad \ldots (3)$$

T, X, Y, AND E ARE CONSTANTS FOR NORMALIZATION

DISTANCE dCX BETWEEN CLUSTER C AND CLUSTER X

$$dCX = 0.5 dAX + 0.5 dBX - 0.25 dAB \quad \ldots (4)$$

FIG. 6

EMOTIONAL VALUE EV

$$EV = E0 \cdot e^{-\lambda t} \quad \ldots (1)$$
$$\lambda = \lambda 0 \,/\, E0 \quad \ldots (2)$$

∴ E0 : EMOTIONAL VALUE AT TIME OF MEMORIZATION
 λ : EMOTION-DEPENDENT ATTENUATION RATE
 λ0 : EMOTION-INDEPENDENT ATTENUATION RATE
 t : TIME BETWEEN GENERATION TIME AND CURRENT TIME

FIG. 7

NOSTALGIA VALUE NV

$$NV = 0 \quad (t < T) \quad \ldots (1)$$
$$NV = N0 \cdot (1 - e^{-\eta(t-T)}) \quad (T \leq t) \quad \ldots (2)$$

∴ N0 : FINAL NOSTALGIA VALUE
  η : AGE-DEPENDENT INCREASE RATE
  T : AGE-DEPENDENT START TIME OF FEELING NOSTALGIA
  t : TIME BETWEEN GENERATION TIME AND CURRENT TIME $$\eta = \eta 0 \,/\, age \quad \ldots (3)$$
$$T = T0 \,/\, age \quad \ldots (4)$$

∴ η0 : AGE-INDEPENDENT CONSTANT INCREASE RATE
  T0 : AGE-INDEPENDENT CONSTANT START TIME OF FEELING NOSTALGIA
  age : AGE OF USER

FIG. 11

RECOLLECTION VALUE DV OF DATA

DV = pEV + (1 − p)NV + CV0 ...(1)

∴ p : REAL NUMBER FROM 0.0 TO 1.0   EMPHASIZE EMOTION:   INCREASE p
                                     EMPHASIZE NOSTALGIA: DECREASE p

CV0 : VALUE OF OFFSET

FIG. 12

RECOLLECTION VALUE CV OF CLUSTER $$CV = \sum_i DV_i \quad \ldots (1)$$

$$CV = \sum_i DV_i / N \quad \ldots (2)$$

∴ N : NUMBER OF PIECES OF DATA IN CLUSTER

FIG. 13

SELECTION OF CLUSTER

TOTAL OF CLUSTERS $TCV = \sum_i CV_i$ ... (1)

NORMALIZED VALUE OF CLUSTER $NCV_i = CV_i / TCV$ ... (2)

SELECT CLUSTER WITH PROBABILITY OF $NCV_i$

FIG. 16

CURRENT STATUS DATA : $(t_n, x_n, y_n, e_n,)$ ...(1)

$t_n$ : TIME, $(x_n, y_n)$ : (LATITUDE, LONGITUDE), $e_n$ : EMOTION

METADATA OF DATA : $(t, x, y, e,)$ ...(2)

$t$ : TIME, $(x, y)$ : (LATITUDE, LONGITUDE), $e$ : EMOTION

DISTANCE d BETWEEN CURRENT STATUS AND STATUS AT TIME OF RECORDING OF DATA $$d = \mathrm{sqrt}(\mathrm{sqr}(t/T - t_n/T) + \mathrm{sqr}(x/X - x_n/X) + \mathrm{sqr}(y/Y - y_n/Y) + \mathrm{sqr}(e/E - e_n/E)) \quad ...(3)$$

∴ T, X, Y, AND E ARE CONSTANTS FOR NORMALIZATION

FIG. 17

VALUE DV OF DATA $DV = d(pEV + (1-p)NV + DV0)$  ... (1)

∴ p : REAL NUMBER FROM 0.0 TO 1.0   EMPHASIZE EMOTION:   INCREASE p
EMPHASIZE NOSTALGIA: DECREASE p

DV0 : VALUE OF OFFSET

METHODS AND APPARATUS FOR SELECTING AND PROVIDING CONTENT DATA USING CONTENT DATA STATUS INFORMATION

CROSS REFERENCES TO RELATED APPLICATIONS

The present invention contains subject matter related to Japanese Patent Application JP 2005-208026 filed in the Japanese Patent Office on Jul. 19, 2005, the entire contents of which are incorporated herein by reference.

BACKGROUND OF THE INVENTION

1. Field of the Invention

The present invention relates to apparatuses and methods for reading content data from a database and outputting the content data to provide the content data to a user, the database storing various types of content data, for example, visual data such as image, video, text, or light, audio data such as music, speech, or sound, smell data such as perfume, tactile data such as vibration, or multimodal data including a combination of these types of data.

2. Description of the Related Art

Past data, particularly, data owned by an individual person, includes various types of data, such as images taken by the person with a camera, video taken or recorded by the person with a video camera or a video tape recorder, e-mails sent or received by the person with a cellular phone or a personal computer, music purchased by the person, voice uttered by the person with a cellular phone, or sound recorded by the person.

Past data owned by an individual person is often related to meaningful memories, so that playback of past data sometimes recollects emotion in the past and causes a sense of nostalgia. The reminiscence therapy is known as a method of psychotherapy based on memories of events, such as memories relating to past data. The reminiscence therapy is said to be effective for clarification of self-identity, improvement in emotional and behavioral aspects, and formation of interpersonal relationships.

Japanese Unexamined Patent Application Publication No. 11-291663 discloses techniques regarding an image album. According to the techniques, past images are used to affect human feeling directly so that the sense of pleasure or the sense of nostalgia will be increased. Japanese Unexamined Patent Application Publication No. 2002-136820 discloses techniques regarding a data-accumulating conversation device. According to the techniques, conversation data is stored with ranks based on the significance or frequency of words, and past conversation data with high ranks are inserted in intervals of conversation, so that it is possible to enjoy natural conversation while recollecting past conversation.

SUMMARY OF THE INVENTION

According to scientific views on memory, memory of events is classified as episodic memory, which is a spatiotemporally situated memory relating to personal experience, and it is said that the episodic memory is first stored in the hippocampus of the limbic system and then accumulated in the temporal lobe of the cerebral cortex as long-term memory.

With time, the episodic memory is replaced with semantic memory, which is a type of lexicographic memory for use of language, and the semantic memory is accumulated in the entire cerebral cortex. In the course of this transformation, rich non-linguistic information in the episodic memory is discarded to achieve generalization. Display or playback of past data relating to the episodic memory reinforces the episodic memory, and inhibits the rich non-linguistic information from being discarded and the episodic memory from transforming into semantic memory.

However, the user is expected to be active in order to use past data. More specifically, in the case of the image album disclosed in Japanese Unexamined Patent Application Publication No. 11-291663, the user is expected to create an image album and open and view the image album as desired. Past data includes various types of data, such as still-picture data, moving-picture data, text data, and audio data. In most cases, the user is expected to be active in order to use the data.

For example, when the past data is still-picture data or moving-picture data, the user is expected to perform operations such as playback, stop, fast-forward, and fast-rewind of a video camera or a video tape recorder. When the past data is e-mails, the user is expected to perform operations such as operations for displaying the e-mails on a cellular phone or a personal computer. When the past data is audio data, the user is expected to perform operations such as playback, stop, fast-forward, and fast-rewind of a music player. As described above, in order to use past data, the user is expected to perform operations by himself/herself for using data.

The user is expected to perform operations by himself/herself only in few occasions in the case of, for example, the data-accumulating conversation device disclosed in Japanese Unexamined Patent Application Publication No. 2002-136820. In this case, however, it is difficult to play back desired conversation at appropriate timing on the basis of the significance or frequency of words alone. Other examples of cases where the user is expected to perform operations by himself/herself only in few occasions include slide-show display of images stored in a hard disc of a personal computer, or shuffled (random) playback of music by a music player or a personal computer.

However, the slide-show display of images only allows displaying images created by the user in an order determined by the user or at random, and shuffled playback of music allows only playback of music selected at random.

When the slide-show displays images created by the user in the order determined by the user, the user already knows what kinds of images will be played back. In the case of random display or random playback, although a sense of unexpectedness can cause certain interest, data that is not suitable in the current situation can be displayed or played back. Thus, it is difficult to provide appropriate content data at appropriate timing so that the content data will directly affect the user's memory or feeling.

It is desired that appropriate data can be provided at appropriate timing so that the data will directly affect the user's memory or feeling.

According to an embodiment of the present invention, there is provided an information providing apparatus including storage means for storing a plurality of pieces of content data, each of the plurality of pieces of content data having metadata attached thereto, the metadata including information regarding a status at a time of generation of the piece of content data; value calculating means for calculating a recollection value of each of the plurality of pieces of content data stored in the storage means, using the metadata associated with the piece of content data; selecting means for selecting a piece of content data that is to be output, on the basis of the recollection values of the individual pieces of content data, the recollection values being calculated by the value calculating means; and output means for outputting the piece of content data selected by the selecting means.

According to another embodiment of the present invention, there is provided an information providing method including the steps of storing a plurality of pieces of content data in storage means, each of the plurality of pieces of content data having metadata attached thereto, the metadata including information regarding a status at a time of generation of the piece of content data; calculating a recollection value of each of the plurality of pieces of content data stored in the storage means, using the metadata associated with the piece of content data; selecting a piece of content data that is to be output, on the basis of the calculated recollection values of the individual pieces of content data; and outputting the selected piece of content data.

With the information providing apparatus or the information providing method, a plurality of pieces of content data is stored in storage means, each of the plurality of pieces of content data having metadata attached thereto, the metadata including information regarding a status at a time of generation of the piece of content data, and a recollection value (significance in recollecting the user's memory) of each of the plurality of pieces of content data is calculated using the metadata associated with the piece of content data.

Then, a piece of content data that is to be output is selected on the basis of the calculated recollection values of the individual pieces of content data, and the selected piece of content data is output for use by the user.

Thus, individual pieces of content data available can be automatically output for use by the user without various operations by the user, on the basis of objective criteria based on recollection values.

According to these embodiments of the present invention, it is possible to evaluate values of content data objectively and to provide appropriate content data at appropriate timing to the user so that the content data will affect the user's memory or feelings more directly.

BRIEF DESCRIPTION OF THE DRAWINGS

FIG. 2 is a diagram for explaining content data and metadata thereof recorded in a database;

FIG. 3 is a diagram for explaining clustering executed by a data manager;

FIG. 6 is a diagram for explaining calculation of the emotional value executed by a data-value calculator 5;

FIG. 7 is a diagram for explaining calculation of the nostalgia value executed by the data-value calculator 5;

FIG. 11 is a diagram for explaining a recollection value of each piece of content data, calculated by the data-value calculator;

FIG. 12 is a diagram for explaining a recollection value of each cluster, calculated by the data-value calculator;

FIG. 13 is a diagram for explaining selection of a cluster that is to be played back, executed by the data manager;

FIG. 16 is a diagram for explaining calculation of a recollection value of content data in the content recording/playback apparatus according to the second embodiment; and FIG. 17 is a diagram for explaining calculation of a recollection value, executed by the data-value calculator in the content recording/playback apparatus according to the second embodiment.

DESCRIPTION OF THE PREFERRED EMBODIMENTS

Now, apparatuses and methods according to embodiments of the present invention will be described. The apparatuses and methods according to the embodiments can be applied to various types of electronic apparatuses that are capable of reading and outputting or playing back various types of content data recorded on recording media, for example, digital still cameras, digital video cameras, MD (Mini Disc (registered trademark of Sony Corporation)) players, IC recorders including semiconductor memories, cellular phone terminals, camera-equipped cellular phone terminals, hard disc recorders, or personal computers.

For simplicity of description, the following embodiments will be described in the context of examples of application to content recording/playback apparatuses that are capable of recording and playing back at least images such as moving pictures or still pictures and sound, such as digital video cameras, camera-equipped cellular phone terminals, or camera-equipped personal computers.

In this specification, the term "content data" is used with a generic meaning, including data that can be used by the user as well as data created by the user, such as existing content data including movies and music that the user is authorized to use as well as image data and audio data created by the user by taking images or recording the user's voice. Obviously, content data may include various types of digital data available, such as text data and graphic data as well as image data and audio data.

First Embodiment

Configuration of Content Recording/Playback Apparatus

Figure 1:
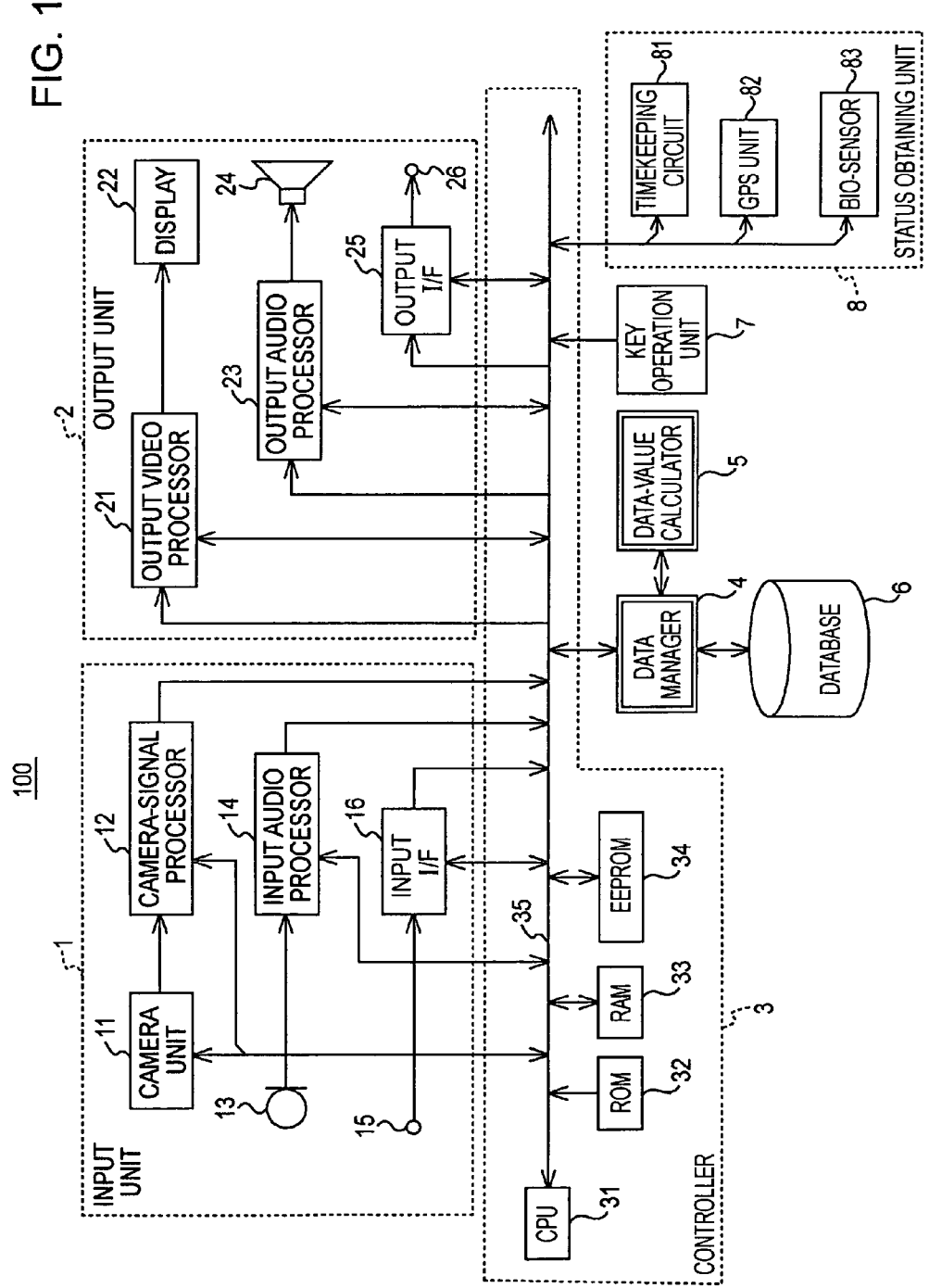
FIG. 1 is a block diagram of a content recording/playback apparatus according to a first embodiment of the present invention.

FIG. 1 is a block diagram of a content recording/playback apparatus 100 according to a first embodiment of the present invention. As shown in FIG. 1, the content recording/playback apparatus 100 generally includes an input unit 1, an output unit 2, a controller 3, a data manager 4, a data-value calculator 5, a database 6, a key operation unit 7, and a status obtaining unit 8.

The input unit 1 captures external information in the form of digital data. In the case of the content recording/playback apparatus 100, the input unit 1 includes a camera unit 11, a camera-signal processor 12, a microphone 13, an input audio processor 14, an input terminal 15, and an input interface (hereinafter abbreviated as an input I/F) 16.

The output unit 2 functions as a monitor of content data captured via the input unit 1, and also functions to output content data stored in a database 6 described later. The output unit 2 includes an output video processor 21, a display 22, an output audio processor 23, a speaker 24, an output interface (hereinafter referred to as an output I/F) 25, and an output terminal 26.

The controller 3 controls parts of the content recording/playback apparatus 100. The controller 3 is a microcomputer including a central processing unit (CPU) 31, a read-only memory (ROM) 32, a random access memory (RAM) 33, and an electrically erasable and programmable ROM (EEPROM) 34, connected to each other via a CPU bus 35.

The data manager 4 is in change of managing content data, for example, by writing content data to or reading content data from the database 6 or attaching information to content data recorded in the database 6, as will be described later in detail.

The data-value calculator 5 calculates a recollection value (the significance in recollecting user's memory) for each piece of content data recorded in the database 6, using a piece of metadata attached thereto, as will be described later. The data manager 4 and the data value calculator 5 cooperate to provided various types of content data from the database 6 at appropriate timings so that the content data will more directly affect user's memory or feeling.

The database 6 includes a recording medium having a relatively large storage capacity, for example, a hard disk or a rewritable optical disk such as a rewritable DVD. As will be described later, the database 6 can store a large number of pieces of content data, such as content data collected by the user via the camera unit 11 or the microphone 13 or content data accepted via the input terminal 15.

The key operation unit 7 accepts inputs corresponding to operations by the user, converts the inputs to electric signals, and supplies the electric signals to the controller 3. Thus, the controller 3 can control relevant parts according to user's instructions accepted via the key operation unit 7.

The status obtaining unit 8 includes a timekeeping circuit 81, a GPS unit 82, and a bio-sensor 83. The status obtaining unit 8 detects a current time, a current position, and bio-information of the user, such as a cardiac rate, and supplies these pieces of information to the controller 3. The bio-information of the user is used to indicate emotion of the user (change in the feeling of the user). The result of detection output from the status obtaining unit 8 is supplied to the data manager 4 via the controller 3, so that the result of detection can be used as information that serves as metadata attached to content data recorded in the database 6.

Operation of Content Recording/Playback Apparatus

Next, an operation of the content recording/playback apparatus according to this embodiment will be described in the context of an example where images and sound are collected via the camera unit 11 and the microphone 13 and stored in the database 6 and the images and sound are played back by the content recording/playback apparatus 100.

When a recording instruction from the user is accepted via the key operation unit 7, the controller 3 of the content recording/playback apparatus 100 controls relevant parts of the input unit 1 to collect images and sound. Although not shown, the camera unit 11 includes an imaging element and an optical block including a lens, a focus mechanism, a shutter mechanism, and an iris mechanism, so that the camera unit 11 captures an image of an object as optical information and forms the image of the object at a predetermined position of the imaging element.

The imaging element is, for example, a charge coupled device (CCD) or complementary metal oxide semiconductor (CMOS) image sensor, which converts an image of an object formed at a predetermined portion thereof into electric signals and supplies the electric signals to the camera-signal processor 12.

The camera-signal processor 12 executes correlated double sampling (CDS) on the image signals supplied thereto to maintain a favorable S/N ratio. The camera signal processor 12 also exercises automatic gain control (AGC) to control the gain. Furthermore, the camera signal processor 12 executes analog/digital (A/D) conversion to generate image data in the form of image signals, and supplies the image data to the data manager 4 via the controller 3.

Furthermore, the camera-signal processor 12 executes camera signal processing on the image data under the control of the controller 3, such as auto focus (AF), auto exposure (AE), and auto white balance (AWB), thereby converting the processed image data into analog video signals, and supplies the analog video signals to the display 22 of the output unit 2, so that an image currently captured via the camera unit 11 is displayed and can be monitored on the display screen of the display 22.

Audio signals collected by the microphone 13 and converted into electric signals are supplied to the input audio processor 14. The input audio processor 14 corrects the frequency and adjusts the level of the analog audio signals supplied thereto under the control of the controller 3 to convert the processed analog audio signals into digital signals, and supplies the digital audio signals to the data manager 4 via the controller 3.

Furthermore, the input audio processor 14, under the control of the controller 3, converts the processed digital audio signals into analog audio signals and supplies the analog audio signals to the speaker 24 of the output unit 2 so that the sound captured via the microphone 13 can be heard via the speaker 24.

The image data and audio data supplied to the data manager 4 as described above constitute content data (AV data) composed of image data and audio data by the function of the data manager 4, and recorded in the database 6. At this time, the data manager 4, under the control of the controller 3, receives a current time from the timekeeping circuit 81 of the status obtaining unit 8, a current position from the GPS unit 82, and bio-information of the user from the bio-sensor 83 (bio-information of the user at the time of collection, e.g., a cardiac rate), and records these pieces of information in the database 6 as metadata attached to the content data recorded.

In this case, when considered in relation to the content data collected, among the pieces of information used as metadata, the current time supplied from the timekeeping circuit 81 indicates the time of generation of the content data, and the current position supplied from the GPS unit 82 indicates the position of generation of the content data. Similarly, the bio-information supplied from the bio-sensor 83 indicates bio-information of the user at the time of generation of the content data.

The current time (time of generation), current position (position of generation), and bio-information (bio-information at the time of generation) attached as metadata to content data are obtained from the status obtaining unit 8 when, for example, collection of images and sound is started according to a user's instruction.

The timing of obtaining the current time, current position, and bio-information is not limited to the timing when collection is started, and may be a timing immediately before the start of recording of content data in the database 6. The position of generation used by the content recording/playback apparatus 100 according to this embodiment includes latitude information and longitude information.

FIG. 2 is a diagram for explaining content data and metadata thereof, recorded in the database 6. As shown in FIG. 2, data A, data B, ... are content data obtained via the camera unit 11 and the microphone 13 of the input unit 1. Each of these pieces of content data has metadata attached thereto, including the time of generation, the position (latitude and longitude) of generation, and bio-information of the user at the time of generation, as shown in FIG. 2.

The time of generation is included in metadata so that it is possible to recognize when the metadata was generated (collected). The time of generation can be used as a criterion for distinguishing content data associated with episodic memory for the user and content data associated with semantic memory for the user.

The position of generation is included in metadata since it is known that place cells exist in the hippocampus of a human brain, which are activated in specific places, and that memory and place are strongly linked. The bio-information at the time of generation is included in metadata since when the amygdala of a human brain is activated with strong emotion, the memory activity of the hippocampus is reinforced so that information is strongly impressed in the memory. Thus, bio-information that changes in relation to emotion of the user, such as a cardiac rate, is used.

In the case of the example shown in FIG. 2, the content data A has attached thereto a time of generation tA, a position of generation (xA, yA), and bio-information eA at the time of generation. The content data B has attached thereto a time of generation tB, a position of generation (xB, yB), and bio-information eB at the time of generation. The time of generation used by the content recording/playback apparatus 100 includes a year, a month, and a day, so that it is possible to identify when the year, month, day, and time when the content data was generated. The metadata is not limited to time, position, and bio-information, and other information may be attached as metadata of each piece of content data.

As described above, each time an instruction for collection is input via the key operation unit 7, images and sound captured via the camera unit 11 and the microphone 13 are stored as content data in the database 6, and the time, position, and bio-information obtained via the status obtaining unit 8 are attached to the content data so that these pieces of information can be used as metadata.

When an instruction for arbitrarily playing back pieces of content data recorded in the database 6 has been input, a recollection value representing the significance in recollecting the user's memory is calculated for each piece of content data by the value calculating function of the data value calculator 5 and the management function of the data manager 4 using the metadata of the piece of content data, and the recollection value is assigned to the piece of content data.

Then, the data manager 4 selects pieces of content data to be played back and arranges the order of playback on the basis of the recollection values assigned to pieces of content data, so that the piece of content data are played back and provided to the user at appropriate timings and so that the pieces of content data played back directly affect the user's memory and feeling. More specifically, it is possible to cause a stronger feeling of nostalgia or to prevent certain memory from becoming simple episodic memory.

The content data (AV data) recorded in the database 6 is played back basically as follows. When an instruction for playing back content data has been input via the key operation unit 7, upon receiving the instruction, the controller 3 controls relevant parts to playback content data. In this case, the data manager 4 reads target content data that is to be played back and supplies the content data to the controller 3.

The controller 3 separates the content data supplied from the data manager 4 into image data and audio data. When the image data and audio data have been compressed, the controller 3 decompresses the compressed image data and audio data to restore original uncompressed image data and audio data. The image data restored is supplied to the output video processor 21 and the audio data restored is supplied to the output audio processor 23.

The output video processor 21 converts the image data supplied thereto into analog video signals, forms a video image in a format, and supplies the video image to the display 22. The display 22 is, for example, a liquid crystal display (LCD), a plasma display panel (PDP), an organic electroluminescence (EL) panel, or a cathode-ray tube (CRT) display. The display 22 receives video signals for display from the output video processor 21 and displays a corresponding image on the display screen thereof.

The output audio processor 23 converts the audio data supplied thereto into analog audio signals, adjusts audio quality or sound volume under the control of the controller 3, and supplies the resulting adjusted audio signals to the speaker 24. Thus, sound corresponding to the audio signals supplied from the output audio processor 23 is output from the speaker 24. The content data recorded in the database 6 can be played back as described above.

As shown in FIG. 1, the content recording/playback apparatus 100 includes the input terminal 15, the input I/F 16, the output I/F 25, and the output terminal 26. The content recording/playback apparatus 100 records content data such as music or movie, accepted via the input terminal 15 and the input I/F 16, in the database 6 via the data manager 4, and plays back the content data via the display 22 or the speaker 24 or outputs the content data via the output I/F 25 or the output terminal 26.

In this case, it is possible to attach information obtained by the status obtaining unit 8 as metadata to the content data accepted via the input terminal 15 and the input I/F 16. When metadata has already been attached, it is possible to use the metadata. The selection of metadata can be instructed by the user via the key operation unit 7.

Also, content data captured via the camera unit 11 and the microphone 13 and stored in the database 6 can be output to an external device via the output I/F 25 and the output terminal 26 simultaneously with playback.

Processing Executed by the Data Manager and the Data-Value Calculator

Next, an example of specific processing executed by the data manager 4 and the data-value calculator 5 in order to select content data and play back the content data so that it is possible to effectively affect the memory or feeling of the user in a case where content data recorded in the database 6 is played back arbitrarily.

Clustering of Content Data by the Data Manager

Figure 4:
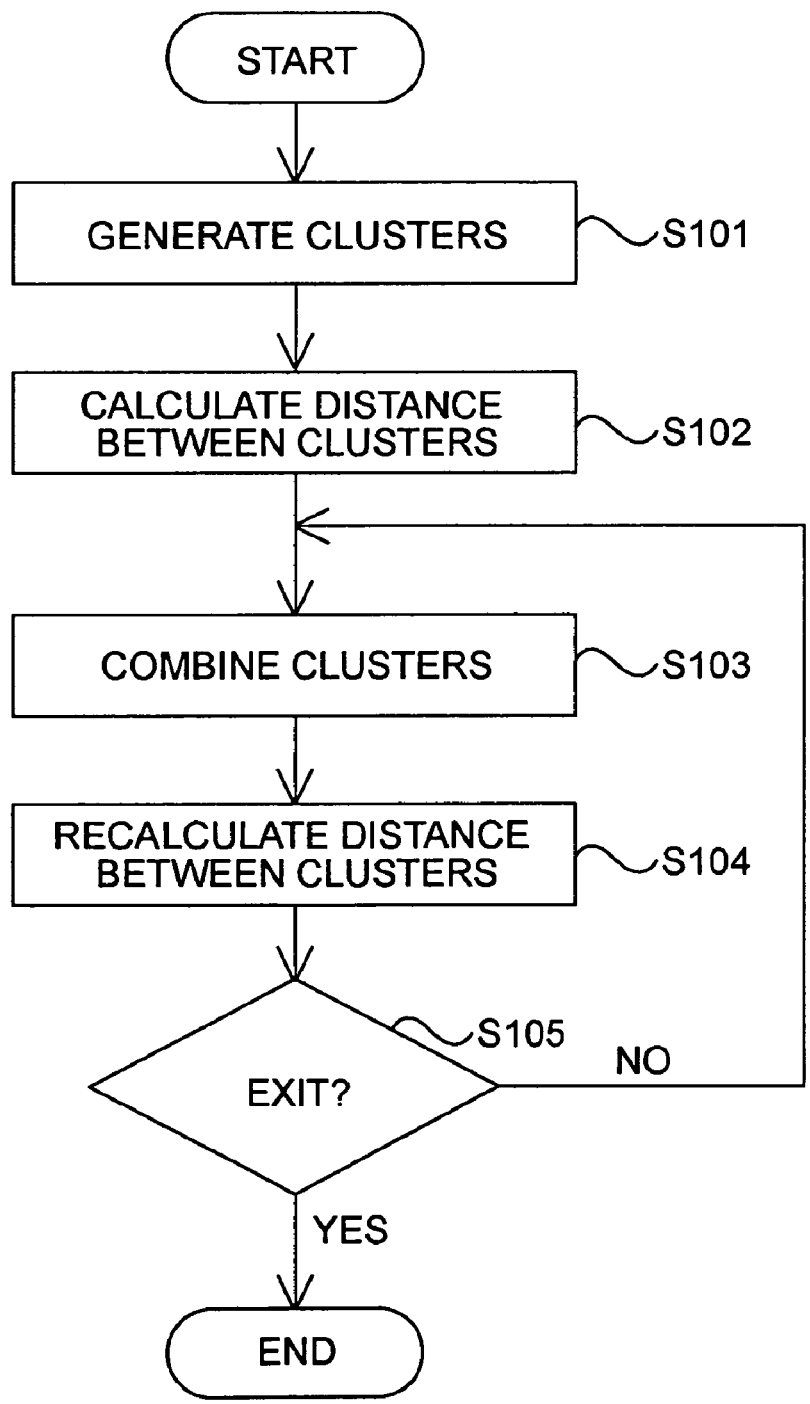
FIG. 4 is a flowchart of a clustering process executed by the data manager.

Now, clustering of content data, executed by the data manager 4, will be described with reference to FIGS. 3 and 4. In the content recording/playback apparatus 100 according to the first embodiment, when content data supplied from the input unit 1 is recorded in the database 6, the data manager 4 records the content data as clusters. That is, the data manager 4 records the content data in the database 6 so that the content data can be handled as a single cluster, i.e., a collection of pieces of related content data.

At an appropriate timing, such as a timing of playback, the data manager 4 clusters pieces of content data recorded as clusters in the database 6 using metadata, basically through cluster analysis, which is a type of statistical multivariate analysis, thereby aggregating pieces of content data having a certain relationship into a single cluster. Various methods of cluster analysis may be used, such as the nearest neighbor method, the furthest neighbor method, the median method, the centroid method, the group average method, or Ward's method. The following description describes a case where the median method is used.

As an example, a case where content data A and content data B with metadata attached thereto are recorded in the database 6 as described with reference to FIG. 2 will be considered. More specifically, each piece of content data recorded in the database 6 has attached thereto metadata (time, latitude, longitude, bio-information). As described earlier, these pieces of metadata represent a time of generation, a position of generation, and bio-information at the time of generation of the associated piece of content data.

Let it be supposed that the metadata of the content data A is (tA, xA, yA, eA), as shown in part (1) of FIG. 3, and that the metadata of the content data B is (tB, xB, yB, eB), as shown in part (2) of FIG. 3. On the basis of these pieces of metadata, the data manager 4 calculates a distance dAB between the content data A and the content data B recorded as different clusters in the database 6.

The distance dAB between the clusters is an evaluative distance that is calculated on the basis of metadata. More specifically, the distance dAB is defined as the square root of the sum of squares of the differences between the metadata of the content data A and the metadata of the content data B regarding time, latitude, longitude, and bio-information, as expressed in equation (3) in FIG. 3.

In equation (3) in FIG. 3, T, X, Y, and E are constants for normalization of time, latitude, longitude, and bio-information, respectively, sqrt denotes a function for calculating a square root, and sqr denotes a function for calculating a square.

As described above, at an initial stage in which clusters including a collection of a plurality of pieces of content data have not been formed, the data manager 4 calculates the distances between pairs of pieces of content data recorded as clusters in the database 6 as distances between pairs of clusters, and combines clusters at close distances. For example, when the calculated distance d between a pair of clusters is less than or equal to a predetermined value, the clusters are combined to form a new cluster.

Thus, when the distance dAB between the content data A and the content data B, recorded as different clusters, is less than or equal to the predetermined value, the content data A and the content data B are combined to form a cluster C including the content data A and the content data B as components.

When combining of clusters has been executed for all the clusters recorded in the database 6, the distances between clusters are calculated again. For example, the distance dCX between the cluster C formed as described above and another piece of content data (cluster) X can be calculated according to equation (4) in FIG. 3. In equation (4) in FIG. 3, dAX denotes the distance between the cluster A and the cluster X, the cluster A now being included in the cluster C, and dBX denotes the distance between the cluster B and the cluster X, the cluster B now included in the cluster C.

Thus, as will be understood from equation (4) in FIG. 3, the distance dCX between the cluster C and the cluster X, the cluster C having been formed by combining the cluster A and the cluster B, is calculated by adding together one half of the distance dAX between the cluster A in the cluster C and the cluster X and one half of the distance dBX between the cluster B in the cluster C and the cluster X, and subtracting a quarter of the distance dAB between the cluster A and the cluster B for the purpose of adjustment.

The distance dAX between the cluster A and the cluster X and the distance dBX between the cluster B and the cluster X are distances between pieces of content data recorded as clusters, so that these distances can be calculated similarly to the case of calculating the distance dAB between the cluster A and the cluster B according to equation (3) in FIG. 3.

By executing clustering of all the clusters recorded in the database 6 in the manner described above, for example, it is possible to aggregate pieces of content data with metadata representing times in a certain time range, positions in a certain position range, or bio-information having values in a certain range into a single cluster. The pieces of content data aggregated into a single cluster can be handled as a set of content data. For example, it is possible to successively play back a plurality of pieces of content data belonging to a single cluster.

Next, clustering of content data, executed by the data manager 4, will be described with reference to a flowchart shown in FIG. 4. FIG. 4 is a flowchart of a clustering process executed by the data manager 4. The process shown in FIG. 4 is executed by the data manager 4 when it is instructed that content data accepted via the input unit 1, such as image data or audio data, be recorded in the database 6, i.e., when it is instructed via the key operation unit 7 to collect images or sound as described earlier.

Upon accepting data that is to be recorded from the input unit 1, such as image data or audio data, in step S101, the data manager 4 forms content data that is to be recorded in the database 6, and records the content as a cluster. Then, in step S102, the data manager 4 calculates the distance between the cluster currently recorded with each of the clusters that have already been recorded in the database 6. In step S102, the distance between the pieces of content data recorded as clusters is calculated according to equation (3) in FIG. 3.

Then, in step S103, the data manager 4 combines clusters so that clusters at close distances are combined to form a new cluster on the basis of the cluster distances calculated in step S102. Then, in step S104, since a new cluster has been formed by combining clusters, the distances between clusters are calculated again. In step S104, the distances between clusters, including the cluster formed by combining clusters, are calculated according to equation (4) in FIG. 3.

Then, in step S105, the data manager 4 checks whether any clusters that can be combined remain. When clusters that can be combined remain, it is determined that a terminating condition is not satisfied, so that the process returns to step S103 and the subsequent steps are repeated. When clusters that can be combined do not exist, it is determined that the terminating condition is satisfied, so that the process shown in FIG. 4 is exited. In this manner, the data manager 4 executes clustering of clusters recorded in the database 6.

Calculation of Values of Content Data and Clusters by the Data-Value Calculator

Next, processing for calculating values of content data and processing for calculating values of clusters formed by clustering of pieces of content data, executed by the data-value calculator 5, will be described.

In the following description, two types of value will be considered as recollection values of pieces of content data or clusters recorded in the database 6, namely, a value that decreases with time and a value that increases with time. As the value that decreases with time, an emotional value EV corresponding to emotion that the user experiences in relation to the data will be considered. As the value that increases with time, a nostalgia value NV corresponding to nostalgia that the user experiences in relation to the data will be considered.

Figure 5:
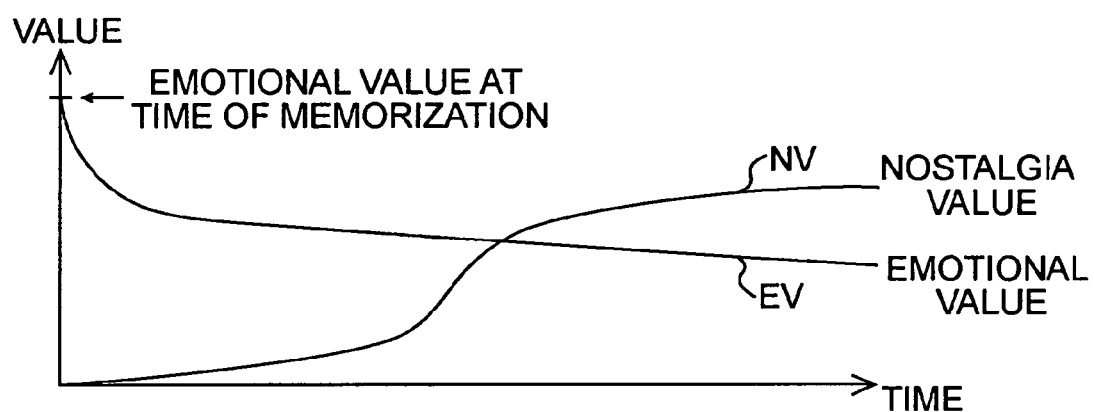
FIG. 5 is a diagram showing an example of a graph of an emotional value and a nostalgia value.

FIG. 5 is a diagram showing an example of a graph of the emotional value EV and the nostalgia value NV. In FIG. 5, the horizontal axis represents the elapse of time, and the vertical axis represents the magnitude of value. The emotional value EV of a piece of content data or a cluster initially has a relatively large value but decreases with time, as indicated by a solid line EV in FIG. 5.

For example, when the user took an image of an unexpected event that the user accidentally encountered, if the user plays back and views the image of the unexpected event relatively soon, the cardiac rate of the user increases as when the image was taken. However, with time, after three days, one week, or one month, the cardiac rate of the user no longer changes even if the user plays back and views the image of the unexpected event. The change in the emotional value EV of the image of the unexpected event for the user can be understood as described above.

The nostalgia value NV of a piece of content data or a cluster initially has a relatively small value but increases with time, as indicated by a solid line NV in FIG. 5. For example, even when an image that was taken while on a trip is played back and viewed immediately after returning home from the trip, the memory is still fresh so that the user does not feel a strong sense of nostalgia. However, with time, after one week, two weeks, one month, or two months, when the image is played back and viewed, the user feels a strong sense of nostalgia in some cases. The change in the nostalgia value NV of the image can be understood as described above.

The emotion that the user experiences in relation to content data, such as an image taken, is considered to follow Ebbinghaus' forgetting curve, and the emotional value EV of the content data can be calculated according to equation (1) in FIG. 6. In equation (1) in FIG. 6, E0 denotes an emotional value at the time of memorization, $\lambda$ denotes an emotion-dependent attenuation rate, and t denotes a time calculated by subtracting a time of generation included in metadata from a current time.

The emotion-dependent attenuation rate $\lambda$ can be calculated according to equation (2) in FIG. 6. In equation (2) in FIG. 6, $\lambda 0$ denotes an emotion-independent constant attenuation rate, and the emotion-dependent attenuation rate $\lambda$ can be calculated by dividing the emotion-independent attenuation rate $\lambda 0$ by the emotional value E0 at the time of memorization. As will be understood from equation (2) in FIG. 6, as the emotion becomes stronger (as the emotional value EV at the time of memorization increases), the emotion-dependent attenuation rate $\lambda$ decreases to inhibit forgetting. It is known that in a human brain, when emotion is strong so that the amygdala is activated, the memory activity in the hippocampus is reinforced so that information is strongly imprinted in memory.

The nostalgia that the user experiences in relation to content data is considered to gradually increase at first and finally become saturated at a constant value. Thus, the nostalgia value NV of the content data can be expressed separately as in equations (1) and (2) in FIG. 7. In equations (1) and (2) in FIG. 7, N0 denotes a final nostalgia value, $\eta$ denotes an age-dependent increase rate, T denotes an age-dependent time at which the user starts feeling nostalgia, and t denotes a time calculated by subtracting a time of generation included in metadata from a current time. The age-dependent time T at which the user starts feeling nostalgia corresponds to a time between the time of generation of the content data and a time when the user starts feeling nostalgia if the content data is played back.

When the time t corresponds to a time before the age-dependent time T at which the user starts feeling nostalgia (when the time t is shorter than a time corresponding to the age-dependent time T at which the user starts feeling nostalgia), the user does not feel a sense of nostalgia, so that the nostalgia value NV is 0 as expressed in equation (1) in FIG. 7. On the other hand, when the time t corresponds to a time after the age-dependent time T at which the user starts feeling nostalgia (when the time t is longer than a time corresponding to the age-dependent time T at which the user starts feeling nostalgia), the nostalgia value NV can be calculated according to equation (2) in FIG. 7.

The age-dependent increase rate $\eta$ can be calculated according to equation (3) in FIG. 7. The age-dependent time T at which the user starts feeling nostalgia can be calculated according to equation (4) in FIG. 7. In equation (3) in FIG. 7, $\eta 0$ denotes an age-independent constant increase rate. In equation (4) in FIG. 7, T0 denotes an age-independent constant time at which the user starts feeling nostalgia. In equations (3) and (4) in FIG. 7, "age" denotes the age of the user.

Figure 8:
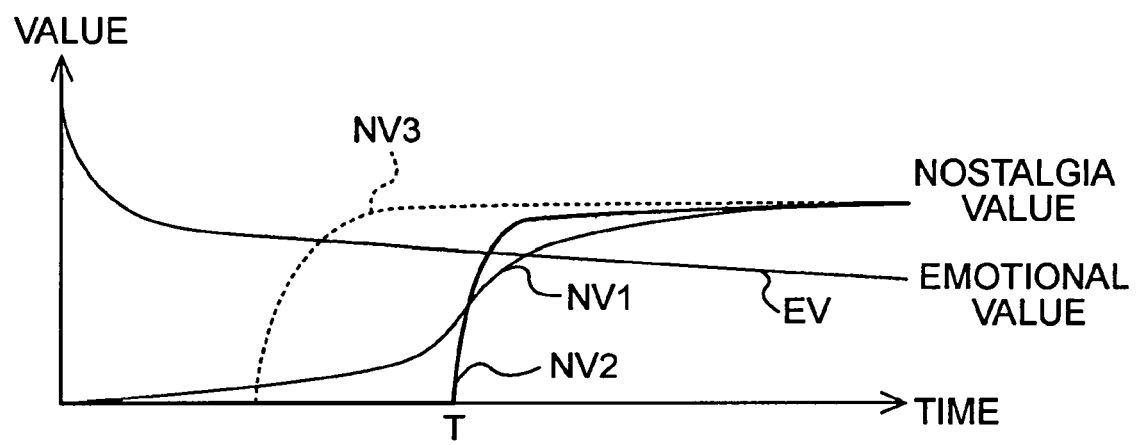
FIG. 8 is a diagram for explaining different nostalgia values.

FIG. 8 is a diagram for explaining different nostalgia values NV1, NV2, and NV3. As described with reference to FIG. 6, nostalgia values have the characteristics of increasing with time and saturating at a constant value as indicated by a solid line NV1. Furthermore, as described with reference to FIG. 7, by introducing the age-dependent time T at which the user starts feeling nostalgia, when the age of the user is high to a certain extent, the nostalgia value of certain content data rapidly increases from the time T and becomes saturated at the constant value, as indicated by a thick solid line NV2.

Conversely, as the age decreases, the age-dependent increase rate $\eta$ and the age-dependent time T at which the user starts feeling nostalgia increase. Thus, as the age of the user decreases, the user starts feeling nostalgia earlier regarding the content data, and the nostalgia value NV becomes saturated at the constant value, as indicated by a dotted line NV3 in FIG. 8. As described above, the nostalgia value NV of content data depends on the age of the user who uses the content data, and may considerably vary with the age of the user.

Figure 9:
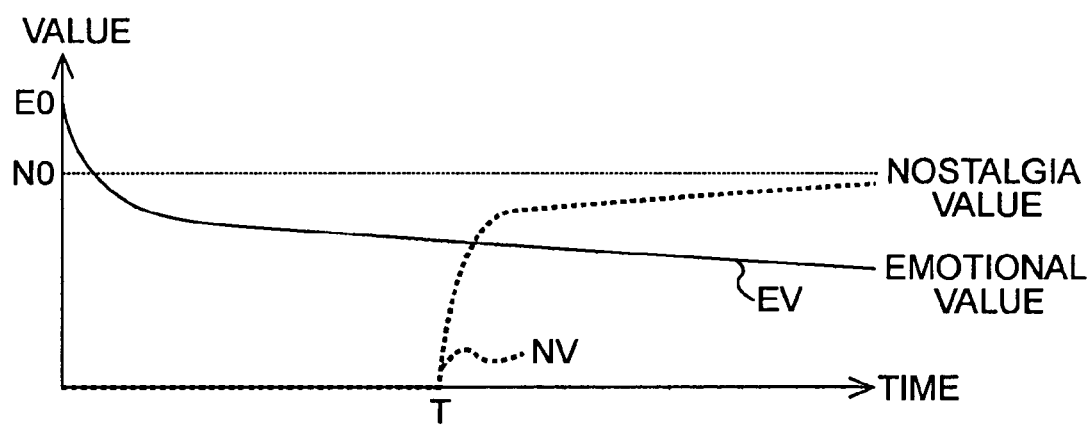
FIG. 9 is a graph of an emotional value and a nostalgia value used in the content recording/playback apparatus.

FIG. 9 is a graph of the emotional value EV and the nostalgia value NV used in the content recording/playback apparatus 100 according to this embodiment. On the basis of the graph that is assumed, the emotional value E0 at the time of memorization, the emotion-dependent attenuation rate X, the final nostalgia value N0, the age-dependent increase rate $\eta$, the age-dependent time T at which the user starts feeling nostalgia, and other values are determined, and the emotional value EV and the nostalgia value NV are calculated according to equation (1) in FIG. 6 and equation (2) in FIG. 7 described earlier.

As will be understood from equation (1) in FIG. 6 and equation (2) in FIG. 7 described earlier, the emotional value EV and the nostalgia value NV of content data can be calculated by assigning a time obtained by subtracting a time of generation included in metadata of the content data (the time of generation of the content) from a current time as t in equation (1) in FIG. 6 and equation (2) in FIG. 7.

In the content recording/playback apparatus 100 according to this embodiment, from the emotional values EV and the nostalgia values NV for individual pieces of content data, calculated in the manner described above, recollection values DV for individual pieces of content are calculated, and recollection values CV for individual clusters are calculated on the basis of the recollection values DV for individual pieces of content data, so that it is possible to play back content data on a cluster-by-cluster basis.

Figure 10:
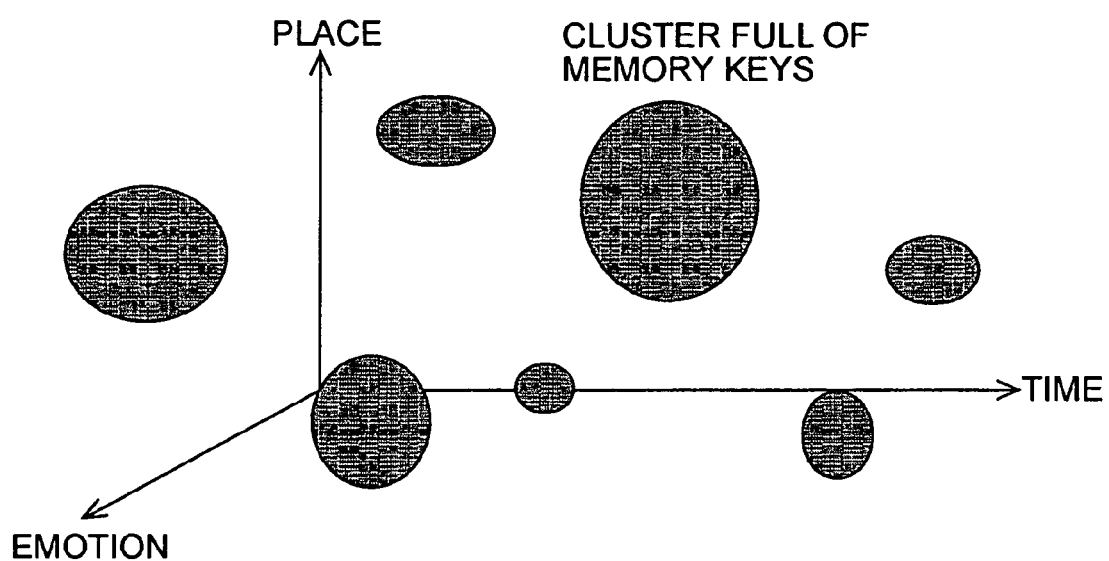
FIG. 10 is a diagram for explaining a spatial concept of clusters composed of pieces of content data stored in the database.

Now, a spatial concept of clusters recorded in the database 6 will be described. FIG. 10 is a diagram for explaining a spatial concept regarding clusters formed by pieces of content data stored in the database 6. As described earlier, each piece of content data recorded in the database 6 has attached thereto a time of generation, a position of generation, and bio-information (information indicating emotion) of the user at the time of generation, and clustering is performed using these pieces of information.

Thus, pieces of content data are clustered in a space defined by a time axis representing the time of generation, a place axis representing the position of generation, and an emotion axis representing the bio-information of the user at the time of generation, as shown in FIG. 10. In FIG. 10, circular areas indicate clusters generated.

In the content recording/playback apparatus 100 according to this embodiment, recollection values of individual clusters are calculated, and clusters with larger recollection values are more likely to be recollected. That is, the recollection values of clusters correspond to priorities of playback, and clusters with higher priorities are played back with higher priorities. In order to assign priorities for playback, as well as assigning temporal precedence for playback, for example, when pieces of content data constituting clusters are image data, the display period, the display area, or special image-quality parameters are adjusted so that clusters with higher recollection values have longer display periods, larger display areas, and higher image qualities compared with clusters with lower recollection values.

The data-value calculator 5 of the content recording/playback apparatus 100 calculates the recollection value DV of each piece of content data by a linear combination of the emotional value EV and the nostalgia value NV of the piece of content data. FIG. 11 is a diagram for explaining the recollection value DV of each piece of content data, calculated by the data-value calculator 5.

The data-value calculator 5 calculates the recollection value DV of each piece of content data according to equation (1) in FIG. 11. In equation (1) in FIG. 11, a coefficient p is a real value in a range of 0.0 to 1.0, and the coefficient p is adjusted to increase when emotion is to be emphasized, while the coefficient p is adjusted to decrease when nostalgia is to be emphasized. CV0 denotes a value of offset, which is described, for example, as metadata of each piece of content. Alternatively, for example, as the value of offset, it is possible to use a value stored in the EEPROM 34 of the content recording/playback apparatus 100.

After calculating recollection values of individual pieces of content data recorded in the database 6, the data-value calculator 5 calculates the recollection value CV of each cluster on the basis of the recollection values of individual pieces of content data. FIG. 12 is a diagram for explaining the recollection value CV of each cluster, calculated by the data-value calculator 5.

As the recollection value CV of a cluster, the sum of the recollection values DV of pieces of content data included in the cluster is used as the recollection value CV of the cluster as expressed in equation (1) in FIG. 12, or an average of the recollection values DV of pieces of content data included in the cluster is used as the recollection value CV of the cluster as expressed in equation (2) in FIG. 12.

When the sum of the recollection values DV of pieces of content data included in a cluster is used as the recollection value CV of the cluster according to equation (1) in FIG. 12, it is possible to select a cluster having a high value as a whole. When the average of the recollection values DV of pieces of content data included in a cluster is used as the recollection value CV of the cluster according to equation (2) in FIG. 12, it is possible to select a cluster including individual pieces of content data having high recollection values DV.

The emotional value EV and the nostalgia value NV for each piece of content data, calculated as described above, and the recollection value DV calculated from the emotional value EV and the nostalgia value NV are managed in association with the piece of content data as metadata of the piece of content data. Furthermore, the recollection value CV of each cluster, calculated on the basis of the recollection values DV of pieces of content data included in the cluster, is also managed in association with the cluster as metadata of the cluster.

The pieces of content data, clusters, and the associated emotional values, nostalgia values NV, and recollection values DV may be managed in the database 6. Alternatively, it is possible to store pieces of content data in the database 6 while managing the emotional values EV, the nostalgia values NV, and the recollection values DV in, for example, the EEPROM 34 of the controller 3.

Selection of Cluster by the Data Manager in Accordance with Values

When the recollection values CV for individual clusters stored in the database 6 have been calculated as described above and arbitrary playback of content data has been instructed, a cluster that is to be played back is selected on the basis of the recollection values CV of individual clusters by the function of the data manager 4. FIG. 13 is a diagram for explaining selection of a cluster that is to be played back, executed by the data manager 4.

When arbitrary playback of content data recorded in the database 6 is executed, the data manager 4 of the content recording/playback apparatus 100 selects content data that is to be played back. Basically, the data manager 4 selects a single cluster according to probabilities that are proportional to the recollection values of individual clusters.

Thus, the data manager 4 calculates the sum TCV of the recollection values CVi of individual clusters stored in the database 6, as expressed in equation (1) in FIG. 13. Then, the data manager 4 calculates normalized recollection values NCVi of the individual clusters by dividing the recollection values CVi of the individual clusters by the sum TCV. The data manager 4 selects a single cluster that is to be played back according to probabilities corresponding to the recollection values NCVi. That is, a cluster whose recollection value contributes a significant part in the entire recollection value is selected as a cluster that is to be played back.

For example, when the recollection values of three clusters A, B, and C are (5.7), (1.8), and (2.5), respectively, the sum TCV of the recollection values is (10.0), so that the three clusters A, B, and C are selected randomly with probabilities of (0.57), (0.18), and (0.25), respectively. In this case, the cluster A is selected about once out of twice, the cluster B is selected about once out of five times, and the cluster C is selected about once out of four times. As described above, a cluster that is to be played back is selected probabilistically so that even clusters with lower values can be played back and presented to the user.

Specific Examples of Playback

As described above, in the content recording/playback apparatus 100 according to the first embodiment, by the functions of the data manager 4 and the data-value calculator 5, recollection values of individual pieces of content data recorded in the database 6 are calculated, and when content data is to be played back arbitrarily, content data that is to be played back is selected on the basis of the recollection values of the individual pieces of content data. Accordingly, content data can be selected at appropriate timings so that the content data affects the user's memory or feeling more effectively.

For example, this is achieved in the form of playback of a slide show of still-picture data recorded in the database 6, or a screen-saver function of a personal computer or the like. Thus, for example, the first embodiment can be applied to applications for output to a liquid-crystal screen of a digital camera or to applications for output to a screen saver of a personal computer in which images taken by a digital camera are stored.

Specific Example of Slide-Show Playback

First, a specific example where image data has been stored in the database 6 and a slide show of images is presented via the output unit 2 in the content recording/playback apparatus 100 according to the first embodiment will be described.

When an instruction for executing slid-show playback has been accepted via the key operation unit 7, the controller 3 controls the data manager 4 to execute clustering of content data. Then, the data manager 4 instructs the data-value calculator 5 to calculate recollection values DV of individual pieces of content data in the form of clusters and recollection values CV of individual clusters, and the data-value calculator 5 calculates recollection values of pieces of content data and clusters accordingly.

Then, on the basis of the recollection values of individual clusters, calculated by the data-value calculator 5, the data manager 4 calculates probabilities of selection of the individual clusters, selects a cluster that is to be played back as a slide show according to the probabilities of selection, and obtains a list of piece of content data included in the cluster selected.

Then, on the basis of the list of pieces of content data, the data manager 4 displays a slide show of images according to a slide-show displaying algorithm. In the slide-show displaying algorithm, the pieces of content data included in the list are sorted in order of time from older to newer, and the images in the pieces of content data are played back and displayed on the display 22 in order of time from older to newer.

In this case, the data manager 4 cooperates, for example, with the data manager 4 to control the output video processor 21 so that data is displayed while changing the value of a display parameter in accordance with the value of the data. For example, data with a high emotional value EV is displayed for a longer period, with a larger size, and at a higher luminance, and data with a high nostalgia value NV is displayed with a high transparency and with a low color saturation so as to look somewhat old.

Next, processing that is executed when accepting input by the user regarding images displayed as slides will be described. In some cases, display in the form of a slide show is not desired by the user, for example, when an image of interest is displayed too small or an image of little interest is displayed too large or too long.

Preferably, the user is allowed to, for example, enlarge the display scale of an image or skip an image by a key operation or the like in such cases. Thus, input of an instruction, such as enlarging, reduction, suspending, or skip, is allowed for each image that is displayed in a slide show.

When it is instructed to enlarge the display scale of an image, it is assumed that the user has evaluated the image positively. Thus, the controller 3 controls the output video processor 21 so that the display scale of the image is enlarged, and adds a predetermined value to the offset value CV0 of the image, which is a piece of metadata of the image data.

Similarly, when it is instructed to suspend a slide-show playback, it is assumed that the user has positively evaluated an image displayed at the time of suspending. Thus, in addition to suspending playback, a predetermined value may be added to the offset value CV0 of the image, which is a piece of metadata of the image data.

On the other hand, when it is instructed to skip an image, it is assumed that the user has evaluated the image negatively. Thus, display of the image is skipped, and a predetermined value is subtracted from the offset value CV0 of the image, which is a piece of metadata of the image data. Similarly, when it is instructed to reduce the display scale of an image, it is assumed that the user has evaluated the image negatively. Thus, in addition to reducing the display scale of the image, a predetermined value may be subtracted from the offset value CV0 of the image, which is a piece of metadata of the image data.

In this manner, it is possible to select a cluster having a high recollection value CV to play back the cluster in the form of a slide show. Thus, as opposed to playback of slide show in the manner that has hitherto been used, it is possible to select content data that is to be played back and to play back the content data at appropriate timing so that the user's memory or feeling can be directly affected by the content data.

Furthermore, since it is possible to change a display parameter and to thereby change a display mode on the basis of the emotional value EV or the nostalgia value NV of content data that is to be played back, images can be presented more effectively. Furthermore, since it is possible to accept user's instructions for enlarging the display scale of an image or skipping an image, adjust the offset value CV0 according to the instructions, and adjust calculated values themselves, it is possible to reflect user's intentions when playing back image content data once played back in the form of a slide show.

Although the description has been given in the context of an example where images have been stored in the database 6 of the content recording/playback apparatus 100, the present invention is not limited to the example. For example, when text of e-mails or data of speech communications is stored as well as pictures, such as in the case of a cellular phone, similarly, it is possible to display the text of e-mails in the form of a slide show while changing the size of text displayed in accordance with values of data, or to play back the data of speech communications in addition to the slide show and while changing the volume for playback in accordance with values of data.

Specific Example of Shuffled Playback of Music

Next, a specific example of a case where music data has been stored in the database 6 and the music data is played back in a shuffled manner by the content recording/playback apparatus 100 according to the first embodiment will be described. In shuffled playback, instead of sequentially playing back pieces of music data included in a list of music data that can be played back, for example, pieces of music data are selected at random and played back.

In shuffled playback, pieces of music are selected in unexpected ways so as to give a sense of surprise, selection of pieces of music is often inappropriate, for example, pieces of music not preferred by the user can be selected and played back successively. Thus, in the content recording/playback apparatus 100 according to the first embodiment, on the basis of recollection values of individual pieces of content data (music data in this example), calculated by the functions of the data manager 4 and the data-value calculator 5 in the manner described earlier, pieces of music data are played back probabilistically while assigning priorities to pieces of music data with higher values. Accordingly, the user can enjoy a more valuable experience of music.

In the example of music data, instead of attaching metadata to content data as in the case of image data described earlier, metadata is attached when the music data is first obtained and played back. Thus, a time of playback, a position of playback, and bio-information of the user at the time of the first playback are attached as metadata.

Furthermore, in the case of music data of a piece of music that has already been listened to in a television program, a radio program, a concert, or the like, by allowing the user to input the time, position, cardiac rate, and so forth at the time of the first listening via the key operation unit 7, a recollection value can be calculated more accurately.

In this case, for example, the name or the address of a place is input for the position of the first listening so that the latitude and longitude of the position can be obtained from a map database or the like stored in another area of the database 6. Furthermore, by defining several levels (e.g., five levels) of excitement, the cardiac rate can be input as bio-information by inputting a level of excitement.

When shuffled playback is instructed, the recollection values DV of individual pieces of music are calculated by the function of the data-value calculator 5 as described earlier, and the data manager 4 calculates probabilities of selection on the basis of the recollection values and selects pieces of music data for playback on the basis of the probabilities of selection.

When music data is actually played back, for example, the data manager 4 and the controller 3 cooperate to control the output audio processor 23 so that a piece of music data with a high emotional value is played back with a large volume so as to enhance an experience of emotion and so that a piece of music with a high nostalgia value is played back through a high-pass filter (HPF) so as to cause nostalgia with a taste of oldness.

Furthermore, when selection for playback is not appropriate, the user can press a fast-forward button so that the piece of music being played back is skipped, and a predetermined value may be subtracted from the offset value of the piece of music data, which is a piece of metadata of the piece of music data, thereby reducing the likelihood of playback of the piece of music data.

In this example, piece of music data that are to be played back are selected on the basis of the recollection values DV of individual pieces of content data or music data. Alternatively, for example, when music data is clustered on an album-by-album basis, pieces of music data that are to be played back may be selected on a cluster-by-cluster (album-by-album) basis, similarly to the case of displaying a slide show of images described earlier.

Summary of Processing for Playing Back Arbitrary Content Data

Figure 14:
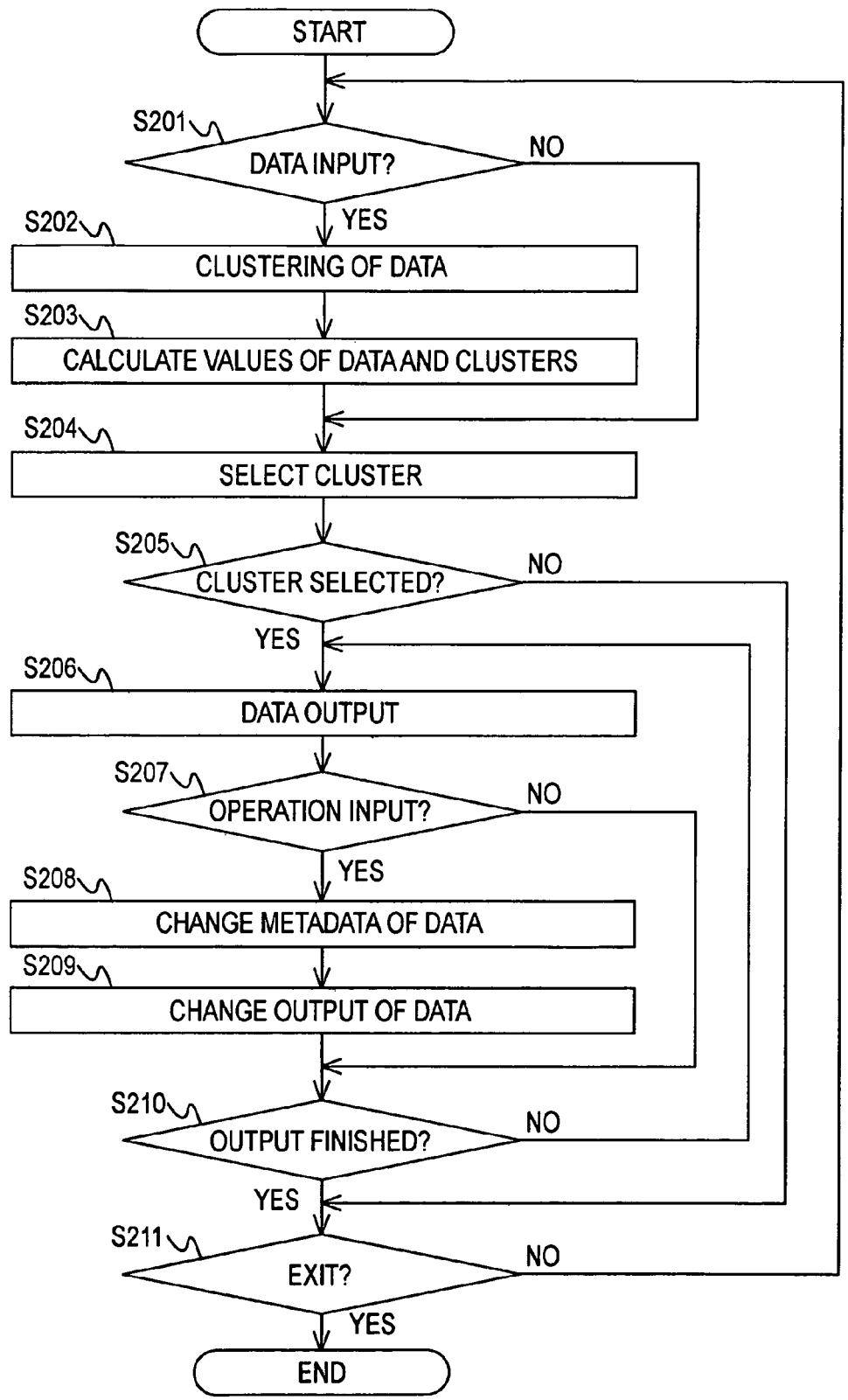
FIG. 14 is a flowchart of a process that is executed when arbitrary content data is to be played back.

Next, processing for arbitrarily playing back content by the content recording/playback apparatus 100 according to the first embodiment will be summarized with reference to a flowchart shown in FIG. 14. The processing according to the flowchart shown in FIG. 4 is executed by the controller 3, the data manager 4, and the data-value calculator 5 when it is instructed to play back arbitrary content data, for example, when slide-show playback or shuffled playback is instructed or a screen-saver function is activated, as described earlier.

When it is instructed to play back arbitrary content data, in step S201, the controller 3 checks whether recollection values of pieces of content data are to be calculated because, for example, data has been input and recorded in the database 6 after a previous playback operation or a time exceeding a predetermined time has elapsed since a previous playback operation.

When it is determined in step S201 that recollection values are to be calculated because, for example, new data has been input, in step S202, the controller 3 controls the data manager 4 to execute clustering of content data recorded in the database 6. Then, in step S203, the data manager 4 instructs the data-value calculator 5 to calculate recollection values of individual pieces of content data and clusters, and the data-value calculator 5 calculates recollection values accordingly.

When it is determined in step S201 that new data has not been input and that the predetermined time has not elapsed since recollection values are calculated last time so that recollection values have not changed, steps S202 and S203 are skipped.

After step S203, or when it is determined in step S201 that recollection values need not be calculated, in step S204, the controller 3 controls the data manager 4 to calculate probabilities of selection and select a cluster that is to be played back according to the probabilities.

Then, in step S205, it is checked whether a cluster (or a piece of content data) that is to be played back has been selected. When it is determined in step S205 that no cluster has been selected because, for example, no cluster that is to be played back exists, the process proceeds to step S211 described later.

When it is determined in step S205 that a cluster has been selected, in step S206, the controller 3 controls relevant parts of the output unit 2 to play back and output the content data selected. Step S206 includes processing for adjusting the manner of playback of the content data according to the emotional value EV or the nostalgia value NV of the content data that is to be played back.

In step S207, it is determined whether an instruction input by the user has been accepted, for example, an instruction for enlarging the display scale or an instruction for skipping an image when the content data that is to be played back is image data, or an instruction for fast-forwarding or an instruction for adjusting the sound volume when the content data that is to be played back is music data.

When it is determined in step S207 that no instruction has been accepted, the process proceeds to step S210 described later. When it is determined in step S207 that an instruction has been input, in step S208, metadata of the content data that is to be played back, such as an offset value, is changed. Then, in step S209, processing according to the user's instruction is executed. More specifically, in step S209, for example, processing for enlarging the display scale of an image is executed when the instruction instructs enlarging the display scale, or processing for skipping an image being output is executed when the instruction instructs skipping.

When the manner of output of data has been changed by the processing in step S209, or when it is determined in step S207 that no instruction has been input by the user, in step S210, it is checked whether the playback and output of content data included in the cluster that is to be played back has been finished.

When it is determined in step S210 that the output has not been finished, the process returns to step S206 and the subsequent steps are repeated. When it is determined in step S210 that the output has been finished, in step S211, it is checked whether the process of playing back arbitrary content data has been finished.

When it is determined in step S211 that the playback process has not been finished, the process returns to step S201 and the subsequent steps are repeated. When it is determined that the playback process has been finished, the process shown in FIG. 14 is exited.

As described above, the content recording/playback apparatus 100 according to the first embodiment can select a cluster having a high recollection value CV and play back and output the cluster. Thus, it is possible to selects content data that is to be played back and to play back the content data at appropriate timing so that the user's memory or feeling can be affected directly by the content data.

Furthermore, since it is possible to accept user's instructions for enlarging the display scale of an image, skipping an image, and so forth, adjust the offset value CV0 according to the instructions, and adjust calculated values themselves, it is possible to reflect user's intentions when playing back content data that has once been played back before. Furthermore, since it is possible to change a playback parameter and thereby change a manner of playback on the basis of the emotional value EV or the nostalgia value NV of content data that is to be played back, content can be played back more effectively.

Second Embodiment

Figure 15:
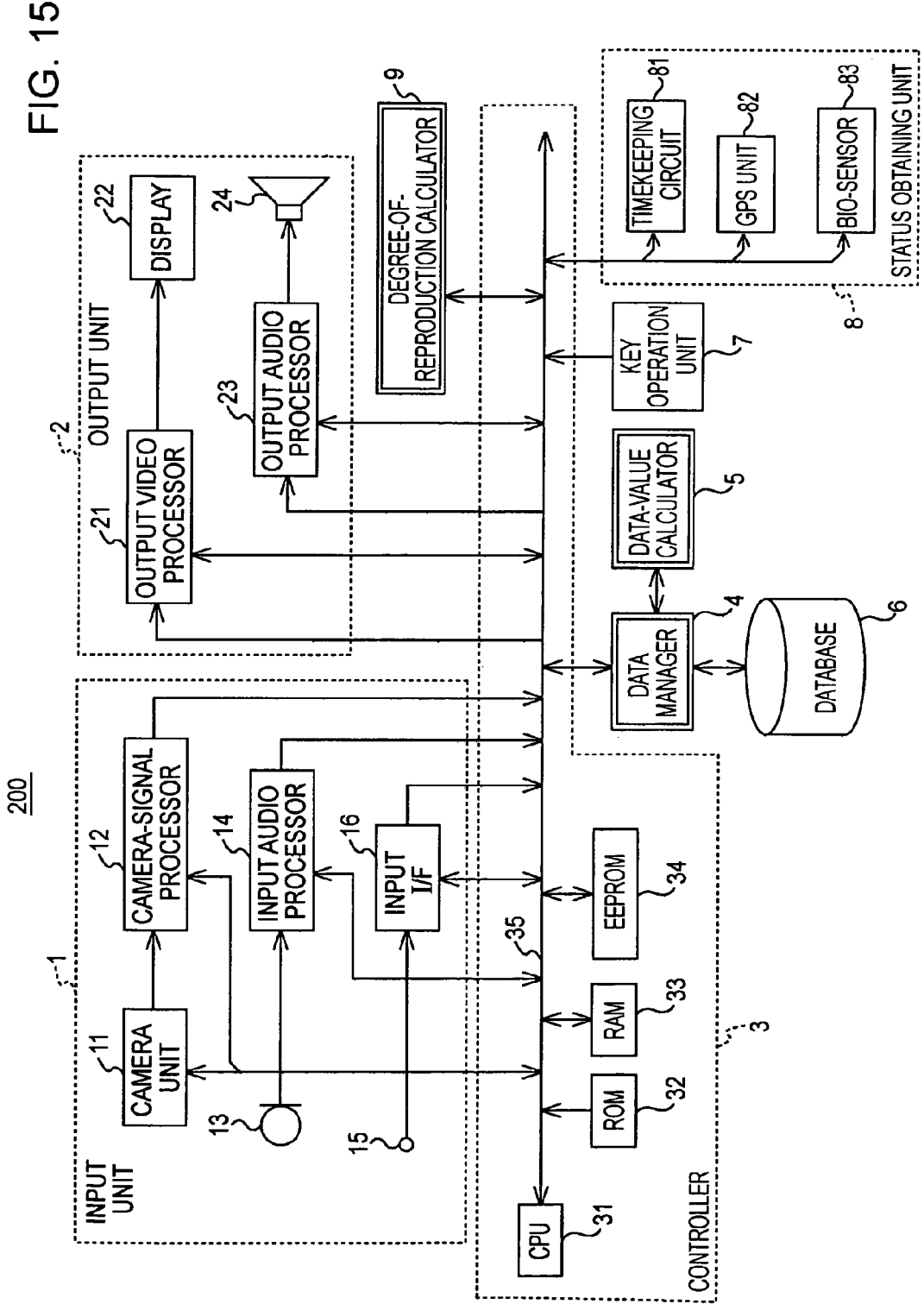
FIG. 15 is a block diagram of a content recording/playback apparatus according to a second embodiment of the present invention.

Next, a content recording/playback apparatus 200 according to a second embodiment of the present invention will be described. FIG. 15 is a block diagram of the content recording/playback apparatus 200 according to the second embodiment. As will be understood by comparison with the content recording/playback apparatus 100 shown in FIG. 1, the content recording/playback apparatus 200 according to the second embodiment is configured the same as the content recording/playback apparatus 100 according to the first embodiment except in that a degree-of-reproduction calculator 9 is provided.

Thus, parts of the content recording/playback apparatus 200 according to the second embodiment configured the same as corresponding parts of the content recording/playback apparatus 100 according to the first embodiment are designated by the same numerals, and detailed descriptions thereof will be omitted to refrain from repeating descriptions given in the context of the first embodiment. Although not shown in FIG. 15, the content recording/playback apparatus 200 shown in FIG. 15 includes the output I/F 25 and the output terminal 26 of the output unit 2 similarly to the content recording/playback apparatus 100 according to the first embodiment.

In contrast to the content recording/playback apparatus 100 according to the first embodiment described earlier, which calculates emotional values on the basis of metadata of content data recorded in the database 6, the content recording/playback apparatus 200 can calculate emotional values also in consideration of a current time, a current position, and current bio-information at the time of playback.

A degree-of-reproduction calculator 9 calculates a degree of reproduction also in consideration of a current time, a current position, and current bio-information at the time of playback. Hereinafter, calculation by the data-value calculator that differs from that in the first embodiment due to the presence of the degree-of-reproduction calculator 9 will be described in detail.

Also in the content recording/playback apparatus 200 according to the second embodiment, clustering by the data manager 4 and calculation of emotional values EV and nostalgia values NV of pieces of content data and clusters by the data-value calculator 5 are executed similarly to the case of the content recording/playback apparatus 100 according to the first embodiment, described with reference to FIGS. 2 to 10.

The effect of presentation of content data recorded in the database 6 to the user depends on the situation around the user as well as the value of the content data itself. For example, on the user's birthday, it is effective to display an image taken on the birthday some years ago. When the user visits a tourist site, it is effective to display an image taken on a previous visit. When the user is moved by viewing something, it is effective to display an image taken when the user was moved similarly.

Basically, as the current situation becomes more approximate to the situation at the time of recording of data, the effect of the data for recollection of the situation becomes higher. In the field of researches on memory, the ability of associating partial information with a whole in memory recollection is referred to as pattern completion. Assuming that the ability of pattern completion is constant, memory recollection becomes easier as the similarity of situation becomes higher.

Thus, in the content recording/playback apparatus 200 according to the second embodiment, the current situation, i.e., the situation in a case where content data stored in the database 6 is played back arbitrarily, is obtained via the status obtaining unit 8, and values of the content data recorded in the database 6 are calculated also in consideration of the current situation obtained.

FIG. 16 is a diagram for explaining calculation of a recollection value of content data in the content recording/playback apparatus 200 according to the second embodiment. Let it be supposed that data representing the current situation obtained via the status obtaining unit 8 exists, as shown in part (1) in FIG. 16, and that metadata attached to content data recorded in the database 6 exists, as shown in part (2) in FIG. 16.

The distance d between the current situation and the situation at the time of recording of the content data in the database 6 is defined as expressed in equation (3) in FIG. 16. That is, the distance d between the current situation and the situation at the time of recording of the content data in the database 6 is the square root of the sum of squares of differences between the time of generation t, the position of generation (x, y), and bio-information e at the time of generation included in the metadata of the content data and the current time tn, the current position (xn, yn), and current bio-information en included in the data representing the current situation.

In FIG. 16, T, X, Y, and E denote constants for normalization of time, position (latitude and longitude), and emotion, respectively. The pieces of metadata and the pieces of data representing the current situation are normalized by the associated constants. In equation (3) in FIG. 16, sqrt denotes a function for calculating a square root, and sqr denotes a function for calculating a square.

By calculating the distance d between the current situation and the situation at the time of recording of the content data in the database 6 as described above, it is possible to recognize the degree of reproduction of each piece of content data recorded in the database 6. When the distance d calculated according to equation (3) in FIG. 16 is large, it is determined that the associated piece of content data currently has a high value of playback. When the distance d calculated is small, it is determined that the associated piece of content data currently has a low value of playback.

As described above, the degree-of-reproduction calculator 9 calculates the distance d between the current situation and the situation at the time of recording of the content data in the database 6 and calculates a degree of reproduction, for example, when content data recorded in the database 6 is arbitrarily played back.

The data-value calculator 5 in the content recording/playback apparatus 200 according to the second embodiment calculates recollection values DV of individual pieces of content data on the basis of the distance d between the current situation and the situation at the time of generation of content data, calculated by the degree-of-reproduction calculator 9 according to equation (3) in FIG. 16.

FIG. 17 is a diagram for explaining calculation of a recollection value DV by the data-value calculator 5 in the content recording/playback apparatus 200 according to the second embodiment. The data-value calculator 5 in the content recording/playback apparatus 200 calculates the recollection value DV of each piece of content data by multiplying a linear combination of the emotional value EV and the nostalgia value NV by the situation distance d.

p denotes a real value in a range of 0.0 to 1.0, and p is increased when emotion is to be emphasized while p is decreased when nostalgia is to be emphasized. DV0 denotes an offset value of content data, which is described as a piece of metadata of the content data.

Using the recollection values DV of individual pieces of content data calculated as described above, similarly to the case of the content recording/playback apparatus 100 according to the first embodiment, the data-value calculator 5 calculates the recollection value CV of each cluster according to an equation shown in FIG. 12. Also in the second embodiment, the recollection value CV of each cluster may be calculated, for example, as the sum of the recollection values DV of pieces of content data included in the cluster according to equation (1) in FIG. 12 or as the average of the recollection values DV of pieces of content data included in the cluster according to equation (2) in FIG. 12.

On the basis of the recollection values CV of individual clusters calculated as described above, similarly to the case of the content recording/playback apparatus 100 according to the first embodiment, probabilities of selection are calculated and a cluster or a piece of content data that is to be played back is selected according to the probabilities of selection. Thus, as described earlier, for example, it is possible to select and play back on the user's birthday an image taken on the birthday some years ago, to select and play back an image taken on a previous visit when the user visits a tourist site, or to select and play back an image that moved the user in a similar manner when the user is moved by viewing something.

That is, the content recording/playback apparatus 200 according to the second embodiment can increase values of pieces of content data for which the situation at the time of generation is more approximate to the current situation so that the piece of content data are selected and played back with priorities. Thus, it is possible to provide content data at appropriate timing so that the content data affects the user's memory or feeling more effectively.

As described above, in the content recording/playback apparatuses according to the first and second embodiments described above, a value that decreases with time and a value that increases with time are defined as two user-dependent values, and various types of content data that have been generated or obtained before can be played back for output and presented to the user at appropriate timings on the basis of the values.

More specifically, by evaluating data on the basis of the two user-dependent values, namely, the value that decreases with time in relation to user's emotion regarding the data (emotional value) and the value that increases with time in relation to user's nostalgia regarding the data (nostalgia value), data that has been recorded before can be played back and presented to the user at appropriate timing.

Furthermore, the user is allowed to feed back user's evaluation of data that is displayed or played back so that the evaluation is reflected on the emotional value and the nostalgia value. Thus, data can be displayed at more appropriate timing as the user uses data more often.

Although the embodiments have been described above in the context of examples where content data is mainly image data such as still-picture data or moving-picture data or audio data such as music data, content data is not limited to these types of content data.

For example, content data may include tactile data, such as control data regarding light that is provided to a lighting device including a controller for the purpose of controlling ON and OFF of light, change in color, or the like, vibration data that is supplied to a vibrating unit such as a chair including a vibrator and a controller for the purpose of controlling vibration by the vibrator, adjustment data that is supplied to an indoor air conditioner or the like for the purpose of adjusting the temperature or humidity in accordance with image or music being played back. Also, content data may include smell data as control information that is supplied to an aroma generator that includes a controller and various perfume materials and that is capable of generating various types of aroma on the basis of control information supplied from outside.

Thus, a content recording/playback apparatus as an information providing apparatus may refer to various types of apparatuses that are capable of acting on the user's vision, hearing, smell, or touch, such as a lighting device including a controller, a vibrator including a controller, or an aroma generator as described above.

Furthermore, although the embodiments have been described above in the context of examples where the cardiac rate is used as bio-information, bio-information is not limited to the cardiac rate. Various types of detectable bio-information may be used, such as the amount of perspiration, the number of times of breathing, the amount of breathing, the state of brain waves, the frequency or magnitude of motion, or the speed of walking. Thus, the bio-sensor 83 may be selected from various types of sensors in accordance with bio-information that is detected, such as an acceleration sensor, a shock sensor, a direction sensor, a bending sensor, a pressure sensor, an image sensor, a pyroelectric sensor, an infrared-ray sensor, a charge sensor, a deformation sensor, a range sensor, a tilt sensor, a magnetic sensor, a current sensor, a capacitance sensor, or an electromagnetic induction sensor.

Furthermore, although the user feeds back an evaluation of data displayed or played back via the key operation unit 7 in the embodiments described above, the user may feed back an evaluation via other devices for accepting input of information by the user, such as a touch panel or a mouse that is connected to the apparatus.

Furthermore, although time, position, and bio-information reflecting emotion are used as metadata in the content recording/playback apparatuses according to the embodiments described above, metadata is not limited to these types of data. For example, data representing an environment at the time of generation of content data, or data extracted from content data itself may be used as metadata attached to the content data.

The environment data refers to information regarding the environment of the user, such as the temperature, the weather, the humidity, the level of noise, or the presence or absence of vibration. The extracted data is information that can be extracted, for example, by analyzing the content data. For example, when the content data represents an image, information can be extracted by analyzing image data of the image, such as the average luminance, hue, or the number of colors used in the image. When the content data represents a piece of music, information can be extracted by analyzing audio data of the piece of music, such as frequency characteristics or tempo.

The environment data and the extracted data may also be attached to the content data as metadata so that values of the content data can be calculated also in consideration of the environment data and the extracted data.

Furthermore, although the embodiments have been described above in the context of examples where content data is arbitrarily selected and played back, such as slide-show playback or shuffled playback, the present invention is not limited to these examples. For example, the user can issue an instruction to assign priority for selection to content data with higher emotional values or issue an instruction to assign priority for selection to content data with higher nostalgia values so that content data that affects the user's memory or feeling effectively will be selected and played back. Obviously, the user can specify desired content data and play back the content data, as in the type of recording/playback apparatus that has hitherto been used.

In the embodiments described above, mainly, the data manager 4 and the data-value calculator 5 cooperate to function as managing means for increasing the emotional value and decreasing the nostalgia value for content data that has been output via output means.

Also, mainly, the data manager 4 and the data-value calculator 5 cooperate to function as correcting means for correcting the magnitude of the emotional value and the magnitude of the nostalgia value of each piece of content data that has been output via output means.

The data manager 4 also functions as selecting means for selecting content that is to be played back and as classifying means for executing clustering. Furthermore, the data manager 4 allows changing the probabilities of selection of content data according to either the emotional value EV and the nostalgia value NV or both the emotional value EV and the nostalgia value NV of each piece of content data.

Furthermore, in the content recording/playback apparatuses according to the embodiments described above, for example, the output video processor 21 of the output unit 2 can adjust the length of display period and the size and brightness of display area in accordance with the magnitude of the emotional value, and adjust the transparency and color saturation for displaying data in accordance with the magnitude of the nostalgia value, under the control of the data manager 4 and the controller 3.

Similarly, in the content recording/playback apparatuses according to the embodiments described above, for example, the output audio processor 23 of the output unit 2 can adjust the volume of music, speech, or sound that is played back in accordance with the magnitude of the emotional value, and adjust a parameter of a frequency filter for music, speech, or sound that is played back in accordance with the magnitude of the nostalgia value, under the control of the data manager 4 and the controller 3.

In the embodiments described above, the functions of the data manager 4 and the data-value calculator 5 indicated by double lines in FIG. 1 and FIG. 15 and the function of the degree-of-reproduction calculator 9 indicated by a double line in FIG. 15 can be achieved by software (programs) executed by the CPU 31 of the controller 3.

It should be understood by those skilled in the art that various modifications, combinations, sub-combinations and alterations may occur depending on design requirements and other factors insofar as they are within the scope of the appended claims or the equivalents thereof.

What is claimed is:

1. A storage medium storing a plurality of pieces of content data, each of the plurality of pieces of content data stored in the storage medium captured by a camera and/or audio recorder and having metadata attached thereto, the metadata including information regarding a status, the status determined at a time of capture, the time of capture being a time the piece of content data was captured by the camera and/or audio recorder;

a processor configured to calculate a recollection value of each of the plurality of pieces of content data stored in the storage medium using the metadata associated with the piece of content data and to select a piece of content data from the plurality of pieces of content data stored in the storage medium to be output, the selected piece of content data selected based on the recollection values of the individual pieces of content data;

an output device for outputting the selected piece of content data;

wherein the output device is configured to adjust an output parameter in accordance with an emotional value and a nostalgia value;

wherein the selected piece of content data is audio data captured by the audio recorder, the audio recorder having a microphone, wherein when the piece of content data that is output is the audio data, the output device adjusts at least a parameter regarding output level in accordance with a magnitude of the emotional value and adjusts at least a parameter regarding audio quality in accordance with a magnitude of the nostalgia value.

2. The information providing apparatus according to claim 1, wherein the emotional value decreases with time:

wherein the nostalgia value increases with time; and wherein the processor calculates the recollection value of each of the plurality of pieces of content data based on the emotional value and the nostalgia value.

3. The information providing apparatus according to claim 1, wherein the processor is configured to increase the emotional value and decrease the nostalgia value of the selected piece of content data output via the output device.

4. The information providing apparatus according to claim 1, further comprising:

an input unit configured to accept input of an instruction by an operation by a user, wherein the processor is configured to correct a magnitude of the emotional value and a magnitude of the nostalgia value of each piece of content data output via the output device, based on the instruction input by the operation by the user and accepted via the input unit in association with the piece of content data output via the output device.

5. The information providing apparatus according to claim 1, wherein the information regarding a status determined at the time of capture of the piece of content data includes time information, position information, and user-emotion information at the time of capture of the piece of content data, wherein the processor manages each of the plurality of pieces of content data using the metadata based on three axes including a time axis, a position axis, and an emotion axis, and clusters the plurality of pieces of content data based on spatial distances based on the three axes, wherein the processor calculates individual recollection values of a plurality of clusters, each of the recollection values corresponding to a sum of the recollection values of pieces of content data belonging to the associated cluster, wherein the processor selects a cluster that is to be output based on the individual recollection values of the plurality of clusters, and wherein the output device is configured to output content data on a cluster-by-cluster basis correspondingly to each selected cluster.

6. The information providing apparatus according to claim 5, further comprising:

an input unit configured to accept input of an instruction by an operation by a user, wherein the processor is configured to correct a magnitude of the emotional value and a magnitude of the nostalgia value of each piece of content data output via the output device, based on the instruction input by the operation by the user and accepted via the input unit in association with the piece of content data output via the output device.

7. The information providing apparatus according to claim 5, wherein the processor changes a probability of selecting each of the plurality of pieces of content data or each of the plurality of clusters in accordance with an amount of attenuation of the emotional value associated with the piece of content data or the cluster.

8. The information providing apparatus according to claim 5, wherein the processor changes a probability of selecting each of the plurality of pieces of content data or each of the plurality of clusters in accordance with an amount of attenuation of the nostalgia value associated with the piece of content data or the cluster.

9. The information providing apparatus according to claim 5, wherein the processor changes a probability of selecting each of the plurality of pieces of content data or each of the plurality of clusters in accordance with a linear combination of a magnitude of the emotional value and a magnitude of the nostalgia value associated with the piece of content data or the cluster.

10. The information providing apparatus according to claim 1, wherein the selected piece of content data comprises image data captured by the camera;

wherein the output device comprises a display, wherein when the piece of content data that is output comprises the image data, the output device adjusts one or more parameters among display period, display area size, and luminance in accordance with a magnitude of the emotional value, and adjusts one or more parameters among transparency and color saturation in accordance with a magnitude of the nostalgia value.

11. The information providing apparatus according to claim 5, further comprising:

status obtaining device for obtaining information regarding a current status when a piece of content data is to be output, wherein the processor calculates a degree of reproduction representing a degree of similarity between the information regarding the status at the time of capture, the information being included in the metadata attached to each of the plurality of pieces of content data stored in the storage medium, and the information regarding the current status obtained by the status obtaining device, wherein the processor selects the piece of content data or the cluster based on magnitudes of the recollection values and the degrees of reproduction of the individual pieces of content data.

12. The information providing apparatus according to claim 11, wherein the status obtaining device at least includes
a timekeeping circuit for providing a current time;
a position determining device for providing a current position; and
a bio-sensor for detecting bio-information relating to emotion, wherein the time information comprises the current time at the time of capture of the piece of content data, the position information comprises the current position at the time of capture of the piece of content data, and the user-emotion information comprises bio-information relating to emotion at the time of capture of the piece of content data.

13. An information providing method comprising the steps of:

Storing a plurality of pieces of content data in storage means, each of the plurality of pieces of content data having metadata attached thereto, the metadata including information regarding a status, the status determined at a time of capture, the time of capture being a time the piece of content data was captured by a camera and/or audio recorder;

calculating a recollection value of each of the plurality of pieces of content data stored in the storage means, using the metadata associated with the piece of content data;

selecting a piece of content data from the plurality of pieces of content data that is to be output, based on the calculated recollection values of the individual pieces of content data;

outputting the selected piece of content data, wherein the selecting is performed after the storing;

wherein when the selected piece of content data is output, and output parameter is adjusted in accordance with an emotional value and a nostalgia value;

wherein the selected piece of content data is audio data captured by the audio recorder, the audio recorder having a microphone, wherein when the piece of content data that is output is the audio data, at least a parameter regarding output level is adjusted in accordance with a magnitude of the emotional value, and at least a parameter regarding audio quality is adjusted in accordance with a magnitude of the nostalgia value.

14. The information providing method according to claim 13, wherein the emotional value decreases with time;
wherein the nostalgia value increases with time; and
wherein the recollection value of each of the plurality of pieces of content data is calculated based on the emotional value and the nostalgia.

15. The information providing method according to claim 13, further comprising the step of:

exercising management so as to increase the emotional value and decrease the nostalgia value of the piece of content data output.

16. The information providing method according to claim 13, further comprising the steps of:

accepting input of an instruction by an operation by a user; and correcting a magnitude of the emotional value and a magnitude of the nostalgia value of each piece of content data output, based on the instruction input by the operation by the user and accepted in association with the piece of content data output.

17. The information providing method according to claim 13,
wherein the metadata of each of the plurality of pieces of content data stored in the storage means includes time information, position information, and user-emotion information at the time of capture of the piece of content data,
wherein the information providing method includes the step of managing each of the plurality of pieces of content data using the metadata based on three axes including a time axis, a position axis, and an emotion axis, and clustering the plurality of pieces of content data based on spatial distances based on the three axes,
wherein individual recollection values of a plurality of clusters formed by the clustering are calculated, each of the recollection values corresponding to a sum of the recollection values of pieces of content data belonging to the associated cluster,
wherein a cluster that is to be output is selected based on the individual recollection values of the plurality of clusters, and
wherein content data is output on a cluster-by-cluster basis correspondingly to each cluster selected.

18. The information providing method according to claim 17, further comprising the steps of:
accepting input of an instruction by an operation by a user; and
correcting a magnitude of the emotional value and a magnitude of the nostalgia value of each piece of content data output, based on the instruction input by the operation by the user and accepted in association with the piece of content data output.

19. The information providing method according to claim 17,
wherein a probability of selecting each of the plurality of pieces of content data or each of the plurality of clusters is changed in accordance with an amount of attenuation of the emotional value associated with the piece of content data or the cluster.

20. The information providing method according to claim 17,
wherein a probability of selecting each of the plurality of pieces of content data or each of the plurality of clusters is changed in accordance with an amount of attenuation of the nostalgia value associated with the piece of content data or the cluster.

21. The information providing method according to claim 17,
wherein a probability of selecting each of the plurality of pieces of content data or each of the plurality of clusters is changed in accordance with a linear combination of a magnitude of the emotional value and a magnitude of the nostalgia value associated with the piece of content data or the cluster.

22. The information providing method according to claim 15,
wherein the selected piece of content data comprises image data captured by the camera;
wherein when the piece of content data that is output comprises the image data, one or more parameters among display period, display area size, and luminance are adjusted in accordance with a magnitude of the emotional value, and one or more parameters among transparency and color saturation are adjusted in accordance with a magnitude of the nostalgia value.

23. The information providing method according to claim 17, further comprising the steps of:
obtaining information regarding a current status when a piece of content data is to be output; and
calculating a degree of reproduction representing a degree of similarity between information regarding the status at the time of capture, the information being included in the metadata attached to each of the plurality of pieces of content data stored in the storage means, and the information regarding the current status obtained;
wherein the piece of content data or the cluster is selected based on magnitudes of the recollection values and the degrees of reproduction of the individual pieces of content data.

24. The information providing method according to claim 23,
wherein the step of obtaining information regarding a current status at least includes the steps of
obtaining a current time;
obtaining a current position; and
detecting bio-information relating to emotion.

25. A computer-storage medium comprising computer-executable modules, the modules comprising:
a storage module storing a plurality of pieces of content data, each of the plurality of pieces of content data having metadata attaché thereto, the metadata including information regarding a status of a user, the status determined at a time of user perceivable generation of the piece of content data;
a value calculator module configured to calculate a recollection value of each of the plurality of pieces of content data stored in the storage unit, using the metadata attached to the piece of content data;
a selector module configured to select a piece of content data from the plurality of pieces of content data stored by the storage module that is to be output by an output device, based on the recollection values of the individual pieces of content data;
wherein when the selected piece of content data is output, and output parameter is adjusted in accordance with an emotional value and a nostalgia value;
wherein the selected piece of content data is audio data captured by the audio recorder, the audio recorder having a microphone,
wherein when the piece of content data that is output is the audio data, at least a parameter regarding output level is adjusted in accordance with a magnitude of the emotional value, and at least a parameter regarding audio quality is adjusted in accordance with a magnitude of the nostalgia value.

* * * * *